H. HENNEBUTTE.
DISTILLATION OF HYDROCARBONS.
APPLICATION FILED FEB. 3, 1913.
1,165,878.
Patented Dec. 28, 1915.
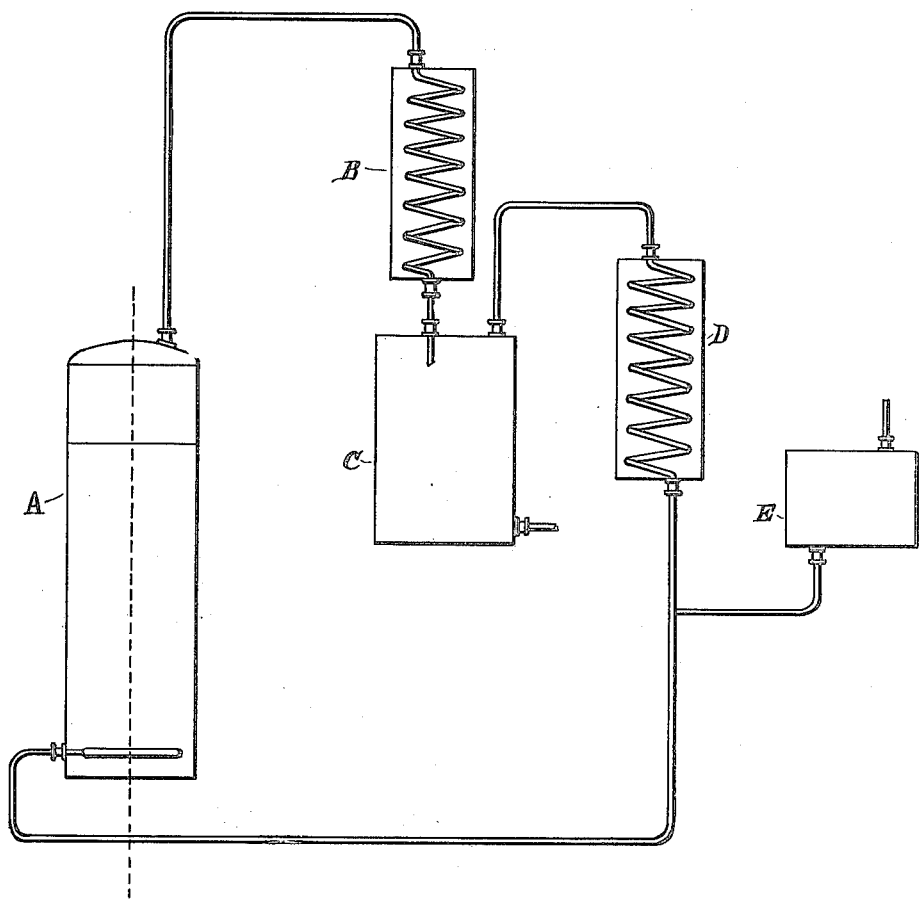
WITNESSES
INVENTOR
Henri Hennebutte
BY

UNITED STATES PATENT OFFICE.

HENRI HENNEBUTTE, OF PARIS, FRANCE, ASSIGNOR TO SOCIÉTÉ DES COMBUSTIBLES INDUSTRIELS, OF PARIS, FRANCE.

DISTILLATION OF HYDROCARBONS.

1,165,878.     Specification of Letters Patent.     Patented Dec. 28, 1915.

Application filed February 3, 1913. Serial No. 745,957.

*To all whom it may concern:*

Be it known that I, HENRI HENNEBUTTE, citizen of Paris, residing at 25 Rue Pigalle, Paris, France, have invented certain new and useful Improvements in the Distillation of Hydrocarbons, of which the following is a specification.

In order to facilitate the distillation of the constituents of coal tar, a current of vapor or air, that acts as a carrying means, is usually passed into the heated mass of tar during distillation.

The present invention is intended to simplify this process and render the same more economical. The source of heat that was required in order to produce the carrying means referred to, is dispensed with and the separation of the constituents of tar by distillation is rendered much more complete and comparatively easy.

According to the principle of this invention the product that is used as a carrying means is not passed into the heated tar in the form of vapor, but is introduced in the form of a liquid at a considerably lower temperature.

On being passed into the receiver or vessel in which the tar is heated, this liquid mixes with the tar and as it is subsequently converted into gas or vapor by the heat of the tar it dissolves the vapors formed by the material that is to be distilled and carries these vapors over into the distillate.

The liquid used as a carrying means must meet with the following requirements: 1. It must readily mix with the tar during distillation and be entirely absorbed by the tar, dissolve in the same and on being evaporated act as a solvent for the coal tar vapors. 2. It must belong to the same chemical class of substances and have similar properties to those of the mass being distilled. 3. It must have a boiling point that is considerably below that of the material being distilled. 4. It must be passed into the mass while undergoing distillation at a temperature that is considerably lower than the boiling point of the mass and when in a liquid state.

The light oils of coal tar that distil at comparatively low temperatures are perfectly suitable under these circumstances for eliminating the heavier constituents that distil at higher temperatures. The chemical and physical affinity and the analogy of composition that exists between these closely related substances constitute the most important factors in using the process of the present invention;

In order to carry this process into effect the liquid substance with a lower boiling point and the chemical and physical properties above referred to, is slowly and continuously passed into the material to be distilled such as coal tar, schist oils or heavy petroleum oils. Thus in the case of petroleum tar for instance that boils at 330° C., light petroleum oils that boil at 170°5 C., will be introduced. In short the boiling point of the reagent used as carrying medium must be considerably lower than the boiling point of the material to be distilled. The liquid thus passed into the mass to be distilled is absorbed and produces by its evaporation and the expansion of its vapors a very active carrying medium, the effect of which is particularly visible in connection with the substances having similar composition and analogous properties. The result obtained is considerably facilitated by the suction of the bubbles of vapor that rise to the surface as well as by the dissolving effect of the liquid used. The vapor tension of the substance that is carried over is diminished in proportion to the volume of the mixture of gases produced, the avaporation of the heavy oils is thus increased and the same are most readily carried over to the condensers. This result cannot evidently be produced by the ordinary method of injecting water vapor or air into the heated mass of tar, as this vapor and air have no chemical or physical affinity for the substances that are to be distilled.

As instead of a current of air or vapor a liquid is introduced into the tar that subsequently produces a current of vapor of similar composition to that of the product to be distilled, the lighter oils are likewise distilled with greater advantage. The mass to be distilled is moreover penetrated more thoroughly as the liquid that is added is converted into gas inside the heavy oils, and as the vapors thus produced expand, a very intimate mixture is obtained of the vapors of the liquid acting as carrying means and those of the volatile constituents of the oils that are to be carried over.

In order to require but a small quantity of the carrying medium and in order to avoid explosion, the liquid introduced can be recuperated indefinitely, by using a device in which the product is made to circulate in a closed cycle. For this purpose the vapors formed are passed into a condenser placed near the distilling apparatus in which the liquid acting as forwarding medium is condensed and collected, and subsequently made to flow back into the distilling apparatus.

By using the present invention the plant required for distilling hydrocarbons (of petroleum, schist and coal tar) can not only be considerably reduced, but be rendered more complete and more economical. The separation of the constituents will be better and capable of any desired variation, particularly if heavy saturated compounds are carried over by light saturated compounds.

To economize the carrying but a small quantity of the carrying medium and in order to avoid bumping, the light liquid introduced can be recuperated indefinitely by using a device shown by way of example in the accompanying drawings. A is the column-like still containing the tar or residual oil, B is a condenser which is intended to condense the heavy oils, that are collected in C and D is a further condenser for recovering the light oil used as a carrying medium, said light oil being sent back to the still A so as to form a continuous cycle. A small tank E containing light oil may moreover be provided for starting the operation.

What I claim is:

1. The process of distilling hydrocarbons which consists, in heating the hydrocarbons and in introducing thereinto lighter hydrocarbons in liquid condition while the temperature of the mass being distilled is higher than the boiling point of said lighter hydrocarbons, whereby the latter are vaporized and serve as a carrier for the distillates.

2. The process of distilling hydrocarbons which consists, in heating the hydrocarbons and in introducing thereinto lighter hydrocarbons in liquid condition and of the same chemical family while the temperature of the mass being distilled is higher than the boiling point of the lighter hydrocarbons, whereby the latter are vaporized and serve as a carrier for the distillates.

3. The process of distilling heavy saturated hydrocarbons which consists, in heating the hydrocarbons and in introducing thereinto lighter saturated hydrocarbons in liquid condition while the temperature of said heavy saturated hydrocarbons is higher than the boiling point of said lighter saturated hydrocarbons, whereby the latter are vaporized and serve as a carrier for the distillates.

4. The process of distilling hydrocarbons which consists in heating the hydrocarbons and in introducing thereinto lighter hydrocarbons in liquid condition while the temperature of the mass being distilled is higher than the boiling point of said lighter hydrocarbons, whereby the latter are vaporized and serve as a carrier for the distillates, and then recuperating such distillates and reintroducing the same to the mass being distilled.

HENRI HENNEBUTTE.

Witnesses:
 JEAN ROSEN,
 HANSON C. COXE,
 JULIE PRÉAUE.